United States Patent [19]

Hillestad

[11] Patent Number: 4,761,104

[45] Date of Patent: * Aug. 2, 1988

[54] PORTABLE TUBE MILLING TOOL

[76] Inventor: Tollief O. Hillestad, P.O. Box 706, Summerland Key, Fla. 33042

[*] Notice: The portion of the term of this patent subsequent to Nov. 4, 2003 has been disclaimed.

[21] Appl. No.: 714,372

[22] Filed: Mar. 21, 1985

Related U.S. Application Data

[63] Continuation-in-part of Ser. No. 402,838, Jul. 29, 1982, Pat. No. 4,620,823, which is a continuation-in-part of Ser. No. 213,814, Dec. 8, 1980, Pat. No. 4,449,871.

[51] Int. Cl.$^4$ .................................................. B23C 3/02
[52] U.S. Cl. ..................................... 409/175; 82/4 C; 408/82; 408/104
[58] Field of Search ............... 409/138, 183, 185, 189, 409/192, 197, 201, 205, 65, 178, 179, 180, 181, 175; 279/2 R, 47, 1 Q; 408/138, 65, 205, 201, 197, 192, 189, 185, 70, 71, 72 R, 82, 80, 81, 83

[56] References Cited

U.S. PATENT DOCUMENTS

| | | | |
|---|---|---|---|
| 3,051,059 | 8/1962 | Davey | 408/82 |
| 3,073,610 | 1/1963 | MacKinder et al. | 279/1 Q |
| 3,434,709 | 3/1969 | Ramsay | 279/2 R |
| 3,638,979 | 2/1972 | Francois et al. | |
| 3,875,832 | 4/1975 | Mayfield | |
| 4,182,588 | 1/1980 | Burkart et al. | |
| 4,236,428 | 12/1980 | Feamster | |
| 4,257,289 | 3/1981 | Groothius | |

Primary Examiner—Gil Weidenfeld
Assistant Examiner—Thomas M. Kline
Attorney, Agent, or Firm—Daniel J. Hudak

[57] ABSTRACT

A portable milling tool for milling pipes, tubes, cylinders, and the like has an expandable sleeve at one end thereof for securing and centering the tool to a workpiece. An adjustable in-line rod connects the sleeve to the tool and permits the sleeve to release or secure the workpiece. An in-line shaft moves the tool into or out of engagement with the workpiece. The tool also is of compact design allowing it to be used in on-site situations wherein tool size is a problem as in milling boiler tubes.

14 Claims, 3 Drawing Sheets

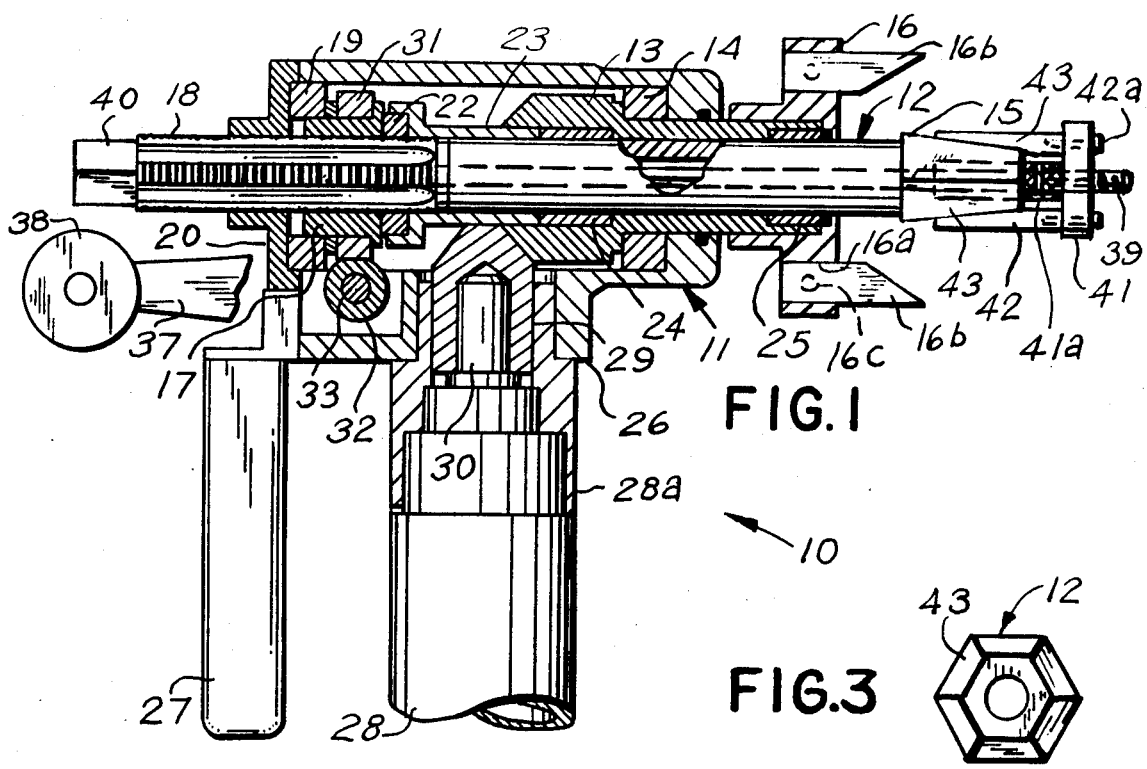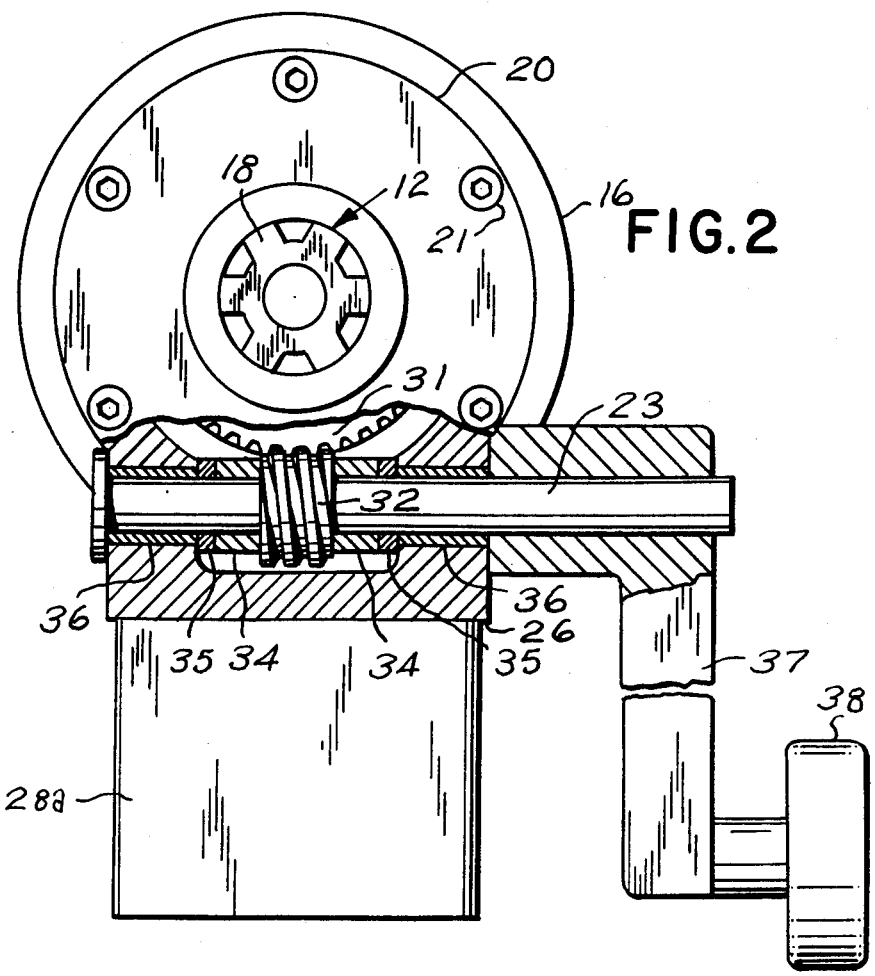

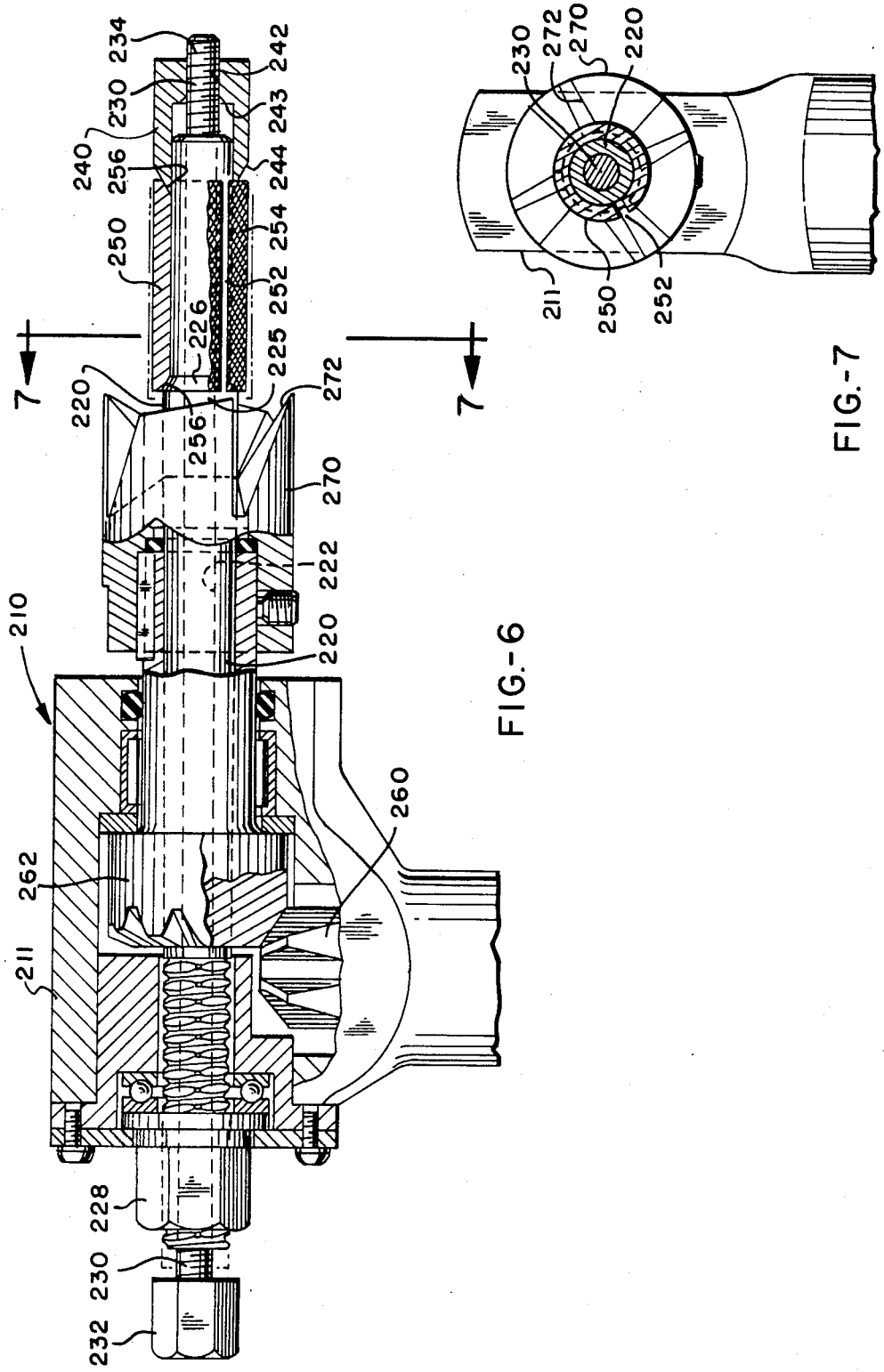

PORTABLE TUBE MILLING TOOL

CROSS REFERENCE

This application is a continuation-in-part of U.S. Ser. No. 402,838, filed July 29, 1982 now U.S. Pat. No. 4,620,825, which in turn is a continuation-in-part of U.S. Ser. No. 213,814, filed Dec. 8, 1980, for "Portable Tube Milling Tool", and now U.S. Pat. No. 4,449,871.

TECHNICAL FIELD

This invention relates to portable powered tools, and more particularly to a compact portable tube milling tool. More specifically, the portable milling tube of the present invention has a pneumatic drive source. An in-line adjustable rod enables an expandable sleeve to be moved outward or inward to engage or disengage a workpiece.

BACKGROUND ART

Heretofore, milling tools have largely been of the standard or conventional fixed or stationary type. That is, the milling machine was usually bolted or secured to the floor of a machine shop or factory and the workpiece was brought to the machine for milling. With regard to workpieces which were brought from an outside location, use of the conventional stationary milling machines was costly, time consuming, and impractical. In order to alleviate this problem, hand grinders were utilized to grind the ends of the workpiece to a desired shape. Not only was this method time consuming in that it required a few hours per item, but also expensive.

The present invention relates to a portable milling tool which can mill an item in approximately a few minutes.

U.S. Pat. No. 3,051,059 to Davey relates to a tube and milling machine for properly arranging a pipe or the like before milling.

U.S. Pat. No. 3,638,979 to Francois et al relates to a force-transmitting system utilizing elongated cylindrical tubes of fiber-reinforced resin.

U.S. Pat. No. 3,434,709 to Ramsay relates to a device for gripping the internal surface of a pipe.

U.S. Pat. No. 3,875,832 to Mayfield relates to a pipe beveling tool having a shaft centrally locked in a pipe to be beveled by means of an internal expanding jaw mandrel.

U.S. Pat. No. 4,182,588 to Burkart et al relates to a positive feed drill have an elongated spindle mounted for reversible longitudinal motion in a drill housing.

U.S. Pat. No. 4,236,428 to Feamster relates to a canopy cutting device for machining canopies in constricted places and includes a housing having various gears or items therein.

U.S. Pat. No. 4,257,289 to Groothius relates to a metal pipe beveling tool having a shaft with a forward end portion on which is mounted a mandrel with movable jaws engagable with the inside of a pipe end to hold the shaft coaxial with the pipe.

These patents do not disclose structure such as a shaft being incapable of rotation within a guide bore, an expandable sleeve, the shaft having an edge end portion thereon, and the like.

DISCLOSURE OF THE INVENTION

It is therefore an aspect of the present invention to provide a portable milling tool having an in-line adjusting rod to engage or release a workpiece.

It is yet another aspect of the present invention to provide a portable milling tool, as above, which is of compact size and can be used in the field or on the job site.

It is yet another aspect of the present invention to provide a portable milling tool, as above, in which an expandable sleeve is attached to one end of said adjusting rod.

It is yet another aspect of the present invention to provide a portable milling tool, as above, wherein a shaft is adjustable forward or backward.

These and other aspects of the present invention will become apparent from the following specification which describes in detail the present invention.

In general, a portable milling tool, comprising: a housing, said housing having a shaft extending through a portion thereof, one end of said shaft having a means for engaging a sleeve, said shaft having a remaining end portion; said remaining end portion of said shaft extending through another portion of said housing and having a feed nut means for causing said shaft to move forward or backward, an internal shaft guide, said internal shaft guide located within said housing, said shaft guide having a bore therein, said remaining shaft end matingly engaging said guide bore in an axial direction, said shaft being incapable of rotation in said guide bore.

Additionally, a portable milling tool comprises a housing, said housing having a shaft extending through a portion thereof, a sleeve, said shaft end portion having a means for engaging said sleeve; said shaft having a bore extending therethrough, a rod, said rod extending through said shaft bore.

BRIEF DESCRIPTION OF DRAWINGS

For a brief understanding of the present invention, reference is made to the attached drawings herein which form a part of the specification and wherein:

FIG. 1 is a fragmentary side elevational view of a milling tool shown partly broken away;

FIG. 2 is an enlarged fragmetary left end view of FIG. 1, shown in elevation;

FIG. 3 is an enlarged right end view of the center shaft of FIG. 1, shown in elevation, with the collet and rod combination removed therefrom, for the sake of clarity;

FIG. 6 is a cross-sectional view of another embodiment of the invention containing a sleeve therein; and FIG. 7 is a cross-sectional view taken on line 7—7 of FIG. 6.

BEST MODE FOR CARRYING OUT THE INVENTION

Figures 4, 5:
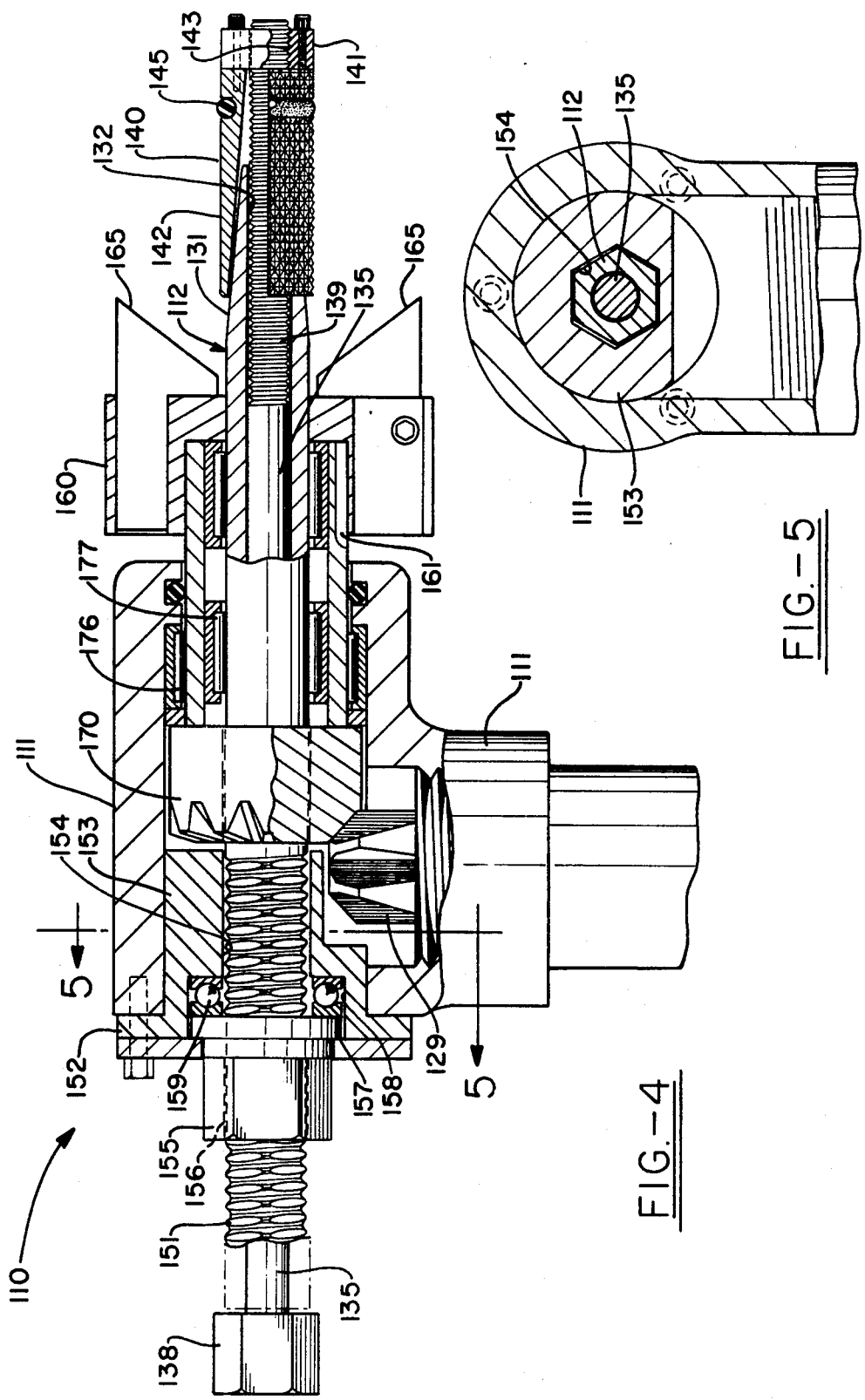
FIG. 4 is a partial cross-sectional elevational side view of an improved tool according to the present invention.
FIG. 5 is a cross-sectional view taken on line 5—5 of FIG. 4.

According to FIG. 1, a tool 10 is shown to include a housing 11, having, on its interior, a center shaft 12 positioned on its longitudinal axis. Shaft 12 is freely received in drive gear 13, and drive gear 13 is journaled in bearing 14, in the forward end of housing 11. Center shaft 12 is hollow, and includes a tapered hexagonal head 15, which extends forward of a tool holder 16, that is fixedly secured to gear 13, in a suitable manner (not shown). Shaft 12 provides a means of centering tool 10 with a longitudinal axis of a boiler tube (not shown), and tool holder 16 includes a plurality of broached, square openings 16a, which are equally and radially spaced apart, so as to receive cutting blades 16b, that are secured in holder 16 by set screw 16c means. A feed nut 17 is received on the splined and threaded end 18 of center shaft 12, and is supported in bearing 19, in the end of housing 11, which is capped by a closure cap 20, secured to housing 11, by a plurality of suitable fasteners 21. A support bearing 22 is received on the splined end 18 of center shaft 12, within a spacer sleeve 23, and a bearing 24 is received within drive gear 13 at one end, for supporting gear 13 on center shaft 12. A bearing 25 is also received in the opposite end of drive gear 13, for supporting gear 13 on shaft 12.

To the bottom 26, which is integral with housing 11, is a handle grip 27, secured thereto in a suitable manner, for the operator to hold tool 10, and an air driven motor 28 is suitably secured to housing 11 by an adapter 28a, in a manner not shown. A pinion gear 29 is suitably secured to the shaft 30 of motor 28, and pinion gear 29 engages with drive gear 13, so as to rotate it on its attached tool holder 16.

A gear 31, on the outer periphery of feed nut 17, engages with worm gear 32, fixedly secured to crank shaft 33, mounted in the bottom 26 of housing 11. A pair of bearings 34, between a pair of spacers 35, and a pair of end bearings 36, mounted in the bottom 26 of housing 11, provide common support means for the crank shaft 33. Crank shaft 33 if fixedly secured, in a suitable manner (not shown), within crank handle 37, which includes a rotatable knob 38.

A rod 39, threaded at one end, and having a head 40 at its opposite end, is received within the hollow shaft 12. The head 40 abuts with splined end 18 of shaft 12, and the threaded end is threadingly received in the center of collet 41, which includes a knurled shank 41a, received in the end of head 15 of shaft 12. A plurality of jaws 42 are secured to collet 41, by suitable fasteners 42a, and jaws 42 grippingly engage the faces 43 of the tapered hexagonal head 15. The collet 41 and rod 39 combination serves as a means of locking tool 10 in the boiler tube that is to be machined.

In use, tool 10 is locked into the end of a boiler tube by means of the collet 41, which, by expanding on the inside of the tube, will automatically center it, when motor 28 is turned on, and, through the crank handle 37, shaft 33, the gears 31 and 32, a slow feed rotation of tool holder 16 is attained. Motor 28, through gear 29, rotates drive gear 13, which rotates tool holder 16 to machine a boiler tube, and the crank handle 37 rotates the feed nut 17, to advance or retract shaft 12 in housing 11, thus urging tool holder 16 forward or backward in controlling the cutting operation.

The present invention also relates to an improved portable milling tool as shown in FIGS. 4 and 5. Such improved tool is very compact and yet efficient and can be utilized on the job site and actually on the tube, pipe, etc., without removing said tube, pipe, etc. from its surrounding environment.

The portable milling tool is generally indicated by the numeral 110. Tool 110 has a housing 111. A shaft, generally indicated by the numeral 112, extends through housing 111 and extends from both ends thereof. One portion of the shaft is tapered at 131 for engagement with a collet. The taper can range from about 2 to about 15 degrees and preferably is about 5 degrees. Shaft 112 is hollow throughout, that is has a bore 132 which extends therethrough. A rod 135 extends through the entire shaft bore 132 and has a knob or head portion 138. Generally such head portion is of a convenient design such that it can be turned by a torque providing tool, as for example a wrench, or the like. Rod 135 at its forward end has threads 139.

A collet residing on tapered shaft 131 is generally indicated by the number 140. Collet 140 has a pair of tapered jaws 142 which have serrations on the outside thereof to form a gripping surface. Since taper 131 is fully rounded, jaws 142 have an arcual internal surface. The taper of jaws 142 can be at any angle such as from about 2 to about 15 degrees and desirably is about 5 degrees. The jaws are attached to collet head portion 141 through any conventional fastening means such as screws and the like. Collet head 141 has internal threads 143 therein which matingly engage threads 139 of the rod. In order to maintain the jaws so that they are seated upon shaft taper 136, a resilient fastening means 145, such as an "O" ring is utilized. Collet 140 is moved either forward or backward, that is away from or towards housing 111, respectively, by turning knob 138 in one direction or another. Thus, through turning of knob 138, rod 135 is also turned. This causes collet 140 through engagement or rod threads 139 with collet threads 143 to either ride up or down tapered shaft 131. Thus, when collet 140 is desired to be attached to the internal portion of a workpiece, for example, a tube, pipe, etc., knobhead 138 is merely rotated in the proper direction causing the collet to ride up tapered shaft 136 and to expand the diameter of the serrated surfaces thereof. Upon being drawn backward a sufficient amount, jaws 142 will engage the internal surfaces of a workpiece, not shown, automatically center the milling tool, and form a firm grip or securement therewith. Of course, any size shaft 131 and collet 140 can be utilized to engage and secure a correspondingly sized tube, pipe, etc.

As shown in FIG. 4, shaft 112 extends through the entire tool housing 111. The remaining or rear section of shaft 112 has threads 151 thereon. These threads extend along a sufficient portion of the shaft so that they extend into housing 111. Flange 152 resides on the housing and is connected thereto with any conventional fastener means such as screws. Flange 152 is integral with or connected to internal shaft guide 153. Hence, shaft guide 153 does not rotate. As best seen in FIG. 5, guide 153 has a hexagonal bore 154 which matingly engages the rear section of shaft 112 which is also hexagonal and has threads 151 thereon. Feed nut 155 has internal threads 156 which matingly engage said rear shaft hexagonal threads 151. Feed nut flange 157 also matingly engages bearing recess 158 of said internal shaft guide 153. Thus, through turning of feed nut 155, shaft 112 is forced either forwardly or rearwardly into or out of the housing. Due to the existence of ball bearings 159, feed nut 155 and flange 157 thereof are permitted to freely rotate within the housing when feed nut 155 is rotated. Shaft 112, however, does not rotate but moves axially forward or rearward through the hexagonal engagement with internal shaft guide 153, since contact of feed nut threads 156 with shaft threads 151 forces the shaft either into or out of the rear portion of the tool. This provision of moving shaft 112 either forward or rearwardly provides contact or disengagement of the workpiece with milling head 160. Should the workpiece be stationary, rotation of feed nut 155 will cause tool 110 to be moved forward or backward. Feed nut 155 can be rotated by any conventional torque item such as a wrench to slowly draw the workpiece or the tool into further contact with milling head 160.

A conventional pneumatically driven motor, not shown, can be attached to the bottom of housing 111. The pneumatic motor through pinion gear 129 engages drive gear 170. Bearings 176 permit drive gear 170 to freely rotate within housing 111. Similarly, bearings 177 permit the drive gear to freely rotate around the shaft. The drive gear is connected to milling head 160 as through keyways 161 or any conventional fastening device. Milling head 160 can be of any conventional design and have cutting edges 165 therein as made from tool type hardened steel.

The utilization of the portable milling tool is as follows. The tool with the forward portion of shaft 112 and collet 140 is inserted into a workpiece such as a tube. Knobhead 138 is rotated to cause collet jaws 142 to move rearwardly or backward along shaft taper 131 and to expand into the inside of the tube. Rotation of knob 138 is continued until a tight and secured fit is obtained. Such operation automatically centers the tube and obtains a tight securement between collet 140 and the tube. An air motor, not shown, is then initiated. Pinion gear 129 drives main gear 170 which in turn causes milling head 160 to rotate. Feed nut 155 is then rotated to cause the workpiece to engage milling cutting edges 165. Feed nut 155 is continued to be rotated until a sufficient degree and amount of milling of the tube has occurred. Naturally, cutting edges 165 may be at any desirable angle. Moreover, they can be of a specific configuration such as to form an offset on a particular workpiece. Once a sufficient milling operation has been finished, feed nut 155 is rotated in the opposite direction, thereby withdrawing the workpiece from it. Knob 138 is then rotated in a direction to cause collet 140 to move forward and thereby releasing tool 110 from the workpiece.

According to the structure of the present invention, a very rapid milling operation is conducted upon a workpiece such as a tube, a pipe, a conduit, and the like. The feature of the expandable collet ensures that the workpiece or tool is automatically centered. Moreover, the provision of in-line rod 135 as well as in-line shaft 112 permits a very small tool housing to be utilized. Accordingly, a very compact portable milling tool can be constructed according to the present invention. Thus, it can be utilized in numerous situations with regard to various in-the-field or on-job-site workpieces. A specific use involves the milling of boiler tube ends actually located within a boiler. Due to the compact size of tool 110, it can be inserted within the tube end with collet 140 engaging the inside portion of the tube. As feed nut 155 is rotated, milling head 150 (and the entire tool) is caused to be moved towards the tube end. Such an operation saves immeasurable costs in that the boiler tubes need not be removed and that the milling occurs actually within the boiler. After the operation is conducted, the tube ends can be welded together to obtain a secure and strong fitting. Moreover, due to the taper of milled tube, a much better weld is obtained.

Although the present invention finds particular use with regard to milling boiler tube ends, it is to be understood that it can be used in numerous types of operations whenever a workpiece requires that an end thereof be milled. For example, the present tool permits header to be installed in boilers. Additionally, the tool can be used to remove various seal welds from various types of pipes, tubes, etc. The invention can also be utilized in the chemical industry, the petroleum industry, or wherever an on-site tube milling operation is desired.

The present invention further relates to a portable milling tool as shown in FIGS. 6 and 7 which has a smaller housing than the embodiment of FIGS. 4 and 5.

The portable milling tool is generally indicated by the numeral 210 as shown in FIG. 6. Tool 210 has a housing 211. A shaft, generally indicated by reference numral 220, resides in housing 211 and extends out from both ends thereof. As shown in FIG. 6, shaft 220 has a front end for engaging a sleeve. End portion 225 has a conical edge or taper 226 at the terminal portion thereof. Shaft edge 226 can be of any general shape, that is curvilinear, slanted, tapered, or the like, so long as the diameter of the edge 226 generally increases at the terminal portion to the shaft. A suitable configuration of edge 226 is a taper such as an approximately 30° angle with regard to the shaft.

Shaft 220 is hollow and accordingly has bore 222 extending therethrough. Rod 230 extends through the entire shaft bore and has a knob or head portion 232 at one end thereof. The head portion can be of any conventional design such that it can be turned by a torque providing tool, as for example a wrench, or the like. Rod 230 at its other end has threads 234 thereon. Threads 234 generally extend a substantial distance along rod 230 as shown.

A securing member 240 such as a nut resides on the threaded end of rod 230. Securing means 240 has threads 242 on the internal diameter thereof which matingly engage threads 234 of the rod. Although threads 242 can extend along the entire length of securing member 240, the member may be countersunk as at 243, and hence threads 242 extend along only the body of the securing member. In any event, the inner edge 244 of securing member 240 is rounded, tapered, curvilinear or the like so long as it generally has an expanding diameter going in an outward direction. Often edge 244 is a rounded taper or conical as shown in the drawings. As with shaft edge 226, securing member edge 244 can generally be of any angle although a shallow angle, for approximately 30°, is suitable.

Located between shaft end 225 and securing member 240 is an expandable sleeve 250. Although various structures can be utilized, a simple split 252 or opening along the length of sleeve 250 will permit it to expand when a force is generally applied thereto in a radially outward direction. Sleeve 250, which is in effect a means for securing a workpiece, has a serrated surface 254 thereon in order to enable it to grip the surface of a workpiece. As seen in FIG. 6, each of the end edges 256 of the sleeve is conical, tapered, or curvilinear. More specifically and desirably, edges 256 are such that they matingly engage shaft edge 226 and securing member edge 244. Thus, upon the application of an inward force by securing member 240, sleeve 250 will be forced against shaft end portion 225 which acts as a means to engage the sleeve. Due to shaft edge 226 and securing member edge 244, as member 240 applies to force sleeve 250, the sleeve will expand. Thus, if sleeve 250 is inserted into a workpiece of a slightly larger diameter, it will engage the internal surface of the workpiece upon expansion.

Although sleeve 250 is shown as an integral member, it is to be understood that other structures can be utilized so long as the sleeve acts as a means for engaging a surface as by expanding. The sleeve can naturally come in various sizes depending upon the particular end use. With regard to the present invention, a suitable size for insertion into various boiler tubes is a sleeve diameter of from about ½" to about ¾" in approximately 0.025" increments. Naturally much larger or smaller sizes can be utilized depending upon the end use.

Inasmuch as rod 230 extends entirely through housing 211, whenever knob 232 is rotated, it will cause securing member 240 to move outward or inward towards housing 111. Thus, upon engagement of securing member 240 with sleeve 250 when such in turn engages shaft edge 226, an expanding force through the tapered edges of the securing member and the shaft edge will cause sleeve 250 to act as a means for engaging a surface be it a tube, pipe, or the like.

Considering housing 211, the structural components therein are essentially the same as that set forth in FIGS. 4 and 5 and accordingly is hereby fully incorporated by reference. Thus, the nut 228 matingly engages shaft 220 as through threads such that upon rotation of the feed nut, the front end of the shaft will either move inward or outward towards housing 111. Shaft 220 can have a rear section which is hexagonal and engages a hexagonal bore within the housing (not shown), such that upon utilization of tool 210 with the milling head thereon, torque transmitting forces encountered will not cause the tool to rotate.

A conventional pneumatically driven motor, not shown, is attached to the bottom of housing 211. Through pinion gear 260, the pneumatic motor engages drive gear 262. Various bearings, not shown, can be utiized to align as well as to permit drive gear 262 to freely rotate about shaft 220. The drive gear is connected to a milling head 270 as shown in FIG. 6. Desirably, milling head 270 is integral. The milling head can also be of any conventional design and have cutting edges 272 thereon.

Although the various structural components within housing 211 are similar to the embodiment set forth in FIGS. 4 and 5, they are different in that they are much smaller or narrower. For example, as shown in FIG. 7, housing 211 actually necks down or is reduced in size from the housing of the pneumatic motor. Accordingly, the various housing components such as the internal shaft guide, the diameter of drive gear 262, and the like are much smaller in diameter. Such a narrow diameter or width of housing 211, as apparent from FIG. 7, permits a milling tube to be utilized in situ that is, without removal from the article in which it resides, e.g. a boiler. For example, the present device is readily suitable for milling the edges of various boiler tubes, or the like as they exist within the heat generating unit.

The in situ utilization of the portable milling tool 210, that is the use of the tool at the repair site, is as follows. The forward portion of the tool, that is securing member 240 as well as sleeve 250, is inserted into a workpiece such as a tube. Inasmuch as member 240 will contact the work piece, it will not rotate. Knob 232 is rotated causing securing member 240 to move inwardly and engage sleeve 250. Upon continued rotation, securing member 240 causes sleeve 250 to expand in a manner as described hereinabove. Rotation of knob 232 continues until a tight and secure fit between sleeve 250 and the tube is obtained. Such means for engaging the internal surface of a workpiece automatically centers the tube. The pneumatic motor is then initiated. Pinion gear 260 causes drive gear 262 to rotate which in turn rotates milling head 270. Feed nut 228 is then rotated to cause the workpiece to move inward toward housing 111 and engage cutting edges 272 of the milling head. The feed nut is caused to be further rotated until a sufficient degree of milling of the tube has occurred. Once the tube has been milled to a sufficient extent, feed nut 228 is rotated in the opposite direction thereby withdrawing the workpiece from the milling head. The pneumatic motor can then be stopped and knob 232 rotated in a direction such that sleeve 250 no longer engages the workpiece.

The structure of the present invention permits a very rapid milling operation to be conducted upon a workpiece such as a tube, a pipe, a conduit and the like. Since various different sizes of sleeves can be utilized, larger or smaller tubes can be quickly milled as by inserting a different size sleeve and/or milling head. The only requirement is that sleeve edges 256 engage shaft edge 226 and securing member edge 244. The provision of the neck down housing 211 as well as in-line rod 230 and in-line shaft 220 permit the tool to be utilized in very small areas. Accordingly, tool 210 can be utilized in many various different situations. For example, the invention can be utilized in any similar situation whenever a tube, pipe, etc., requires milling such as in the petroleum industry, chemical industry, or the like.

While in accordance with the patent statutes, a best mode and a preferred embodiment has been described in detail, the scope of the invention is set forth by the scope of the attached claims.

What is claimed is:

1. A portable milling tool, comprising:
   a housing, said housing substantially enclosing an internal shaft guide, a pinion gear and a drive gear, said housing further having a shaft extending through a portion thereof, a front end of said shaft having a means for expandably engaging a sleeve, said shaft having a remaining end portion;
   said remaining end portion of said shaft extending through another portion of said housing and having a feed nut means for causing said shaft to move inward or outward of said housing, said shaft guide having a bore therein, said remaining shaft end matingly engaging said shaft guide bore in an axial direction, said shaft guide having means to prevent rotation of said shaft in said shaft guide bore, said pinion gear connected to said drive gear; means for mounting said drive gear for rotation within said housing coaxially with and coaxially spaced apart from said shaft guide, and a milling head, said drive gear connected to said milling bend.

2. A portable milling tool according to claim 1, wherein said shaft has a bore therein, and wherein said rod extends through said shaft bore, one end of said rod having a securing member thereon.

3. A portable milling tool according to claim 2, wherein said rod has a remaining end portion, said remaining end portion of said rod having a knob thereon, and whereby movement of said knob causes said securing member to move inward towards said housing or outward therefrom.

4. A portable milling tool according to claim 3, wherein said front end of said shaft contacts one end of said sleeve and said securing member contacts the other end of said sleeve, including a pneumatic motor, said pneumatic motor connected to said pionion gear.

5. A portable milling tool according to claim 3, wherein said front end of said shaft has a taper portion, said taper portion matingly engaging said sleeve end portion, said securing member having an edge, said securing member edge matingly engaging the remaining end portion of said sleeve, and said sleeve being expandable upon forcible engagement of said sleeve with said tapered portion of said front end of said shaft.

6. A portable milling tool according to claim 4, wherein said front end of said shaft has a taper portion, said taper portion matingly engaging said sleeve end portion, said securing member having an edge, said securing member edge matingly engaging the remaining end portion of said sleeve, and said sleeve being expandable upon forcible engagement of said sleeve with said tapered portion of said front end of said shaft.

7. A portable milling tool according to claim 4, wherein said pneumatic motor has a housing, said tool housing having a smaller diameter than said motor housing.

8. A portable milling tool according to claim 5, including a pneumatic motor, said pneumatic motor connected to said pinion gear, wherein said pneumatic motor has a housing, said tool housing having a smaller diameter than said motor housing.

9. A portable milling tool, comprising:
a tool housing, said housing substantially enclosing an internal shaft guide, a pinion gear and a drive gear, said housing further having a shaft extending through a portion thereof, said shaft having a front end,
an expandable sleeve, said shaft front end having a means for expandably engaging said sleeve;
said shaft having a bore extending therethrough, a rod, said rod extending through said shaft bore, said shaft guide having a bore therein, said remaining shaft end matingly engaging said guide bore in an axial direction, said shaft being incapable of rotation in said guide bore,
said pinion gear connected to said drive gear; means for mounting said drive gear for rotation within said housing coaxially with and coaxially spaced apart from said shaft guide, and
a milling head, said drive gear connected to said milling head, a pneumatic motor, said pneumatic motor connected to said pinion gear.

10. A portable milling tool according to claim 9, wherein said shaft extends through said housing and said remaining shaft end has a feed unit means for causing said shaft to move inward or outward of said housing.

11. A portable milling tool according to claim 10, including a securing means, one end of said rod having said securing means thereon, said securing means movable inward and outward towards said housing on said rod end.

12. A portable milling tool according to claim 11, wherein said securing means is capable of contacting said sleeve and causing said sleeve to engage said shaft front end expanding means so that said sleeve is expanded.

13. A portable milling tool according to claim 11, wherein said front end of said shaft sleeve engaging means is a taper, said shaft front end taper matingly engaging an end of said sleeve, said securing means having an edge, said securing means edge matingly engaging the remaining end of said sleeve.

14. A portable milling tool according to claim 13, wherein said rod extends through said housing and has a remaining end, said remaining rod end having a knob thereon whereby movement of said knob causes said securing means to move inward or outward towards said housing on said rod.

* * * * *